(12) United States Patent
Jacob et al.

(10) Patent No.: US 9,619,913 B2
(45) Date of Patent: Apr. 11, 2017

(54) ANIMATION EDITING

(71) Applicant: MICROSOFT TECHNOLOGY LICENSING LLC., Redmond, WA (US)

(72) Inventors: Kurt B Jacob, Redmond, WA (US); Timothy A Barham, Brisbane (AU); Alexander Sher, Bellevue, WA (US); Ryan J Salva, Seattle, WA (US); Michelle I Rosenthal, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 188 days.

(21) Appl. No.: 13/907,997

(22) Filed: Jun. 3, 2013

(65) Prior Publication Data

US 2014/0359430 A1    Dec. 4, 2014

(51) Int. Cl.
*G06T 13/00* (2011.01)

(52) U.S. Cl.
CPC .......... *G06T 13/00* (2013.01); *G06T 2213/08* (2013.01); *G06T 2213/12* (2013.01)

(58) Field of Classification Search
CPC .......................................... G06T 13/00–13/80
See application file for complete search history.

(56) References Cited

U.S. PATENT DOCUMENTS

| | | | |
|---|---|---|---|
| 8,164,596 B1 | 4/2012 | Bech | |
| 8,234,564 B2 | 7/2012 | Drieu et al. | |
| 2007/0283243 A1* | 12/2007 | Beiser | G06F 17/227 715/234 |
| 2009/0228784 A1* | 9/2009 | Drieu et al. | 715/235 |
| 2013/0088495 A1* | 4/2013 | Bech | 345/467 |
| 2013/0127875 A1 | 5/2013 | Blas, Jr. et al. | |
| 2013/0132818 A1 | 5/2013 | Anders et al. | |
| 2013/0271472 A1 | 10/2013 | Duran | |
| 2015/0121297 A1* | 4/2015 | Ying et al. | 715/783 |

OTHER PUBLICATIONS

"International Search Report and Written Opinion Received for Patent Application No. PCT/US2014/040103", Mailed Date: Sep. 17, 2014, 11 Pages.

(Continued)

*Primary Examiner* — Daniel Hajnik

(57) ABSTRACT

An animation can be selected. Pieces of the documents that pertain to the selected animation can be extracted from the document closure for the web page in which the animation appears. A composite data structure can be created therefrom. The winning set of @keyframes rules referenced by the animation-name property of a style rule (the virtual winning rule) can be computed and represented in a data structure. The winning animation properties can establish the timing properties to preview and edit the animation in a user interface without running the whole application. The data structure represented in the visual preview can be edited by applying user gestures to the animation displayed in a preview user interface (UI). The user changes can be mapped to changes to property values in the data structure and the underlying documents.

19 Claims, 5 Drawing Sheets

(56) References Cited

OTHER PUBLICATIONS

"Blend for Visual Studio 2012 (Windows Store Apps)", Retrieved at <<http://msdn.microsoft.com/en-us/library/windows/apps/jj129478.aspx>>, Aug. 26, 2012, pp. 1-3.
Jackson, et al., "CSS Animations", Retrieved at <<http://www.w3.org/TR/css3-animations/>>, Feb. 19, 2013, pp. 1-27.
Lazaris, Louis, "An Introduction to CSS3 Keyframe Animations", Retrieved at <<http://coding.smashingmagazine.com/2011/05/17/an-introduction-to-css3-keyframe-animations/>>, May 17, 2011, pp. 1-37.
Markbage, Sebastian, "Convert a SVG Path to CSS Animation Keyframes", Retrieved at <<http://blog.calyptus.eu/seb/2011/09/csspathanimation/>>, Sep. 12, 2011, pp. 1-8.
Waterhouse, Tom, "The Guide to CSS Animation: Principles and Examples", Retrieved at <<http://coding.smashingmagazine.com/2011/09/14/the-guide-to-css-animation-principles-and-examples/>>, Sep. 14, 2011, pp. 1-29.
"Create Mobile CSS3 Animations with Ease", Retrieved at <<http://www.sencha.com/products/animator/changelog>>, Jul. 2, 2012, pp. 1-3.
"International Preliminary Report on Patentability Issued in PCT Application No. PCT/US2014/040103", Mailed Date: Oct. 1, 2015, 7 Pages.

* cited by examiner

ANIMATION EDITING

BACKGROUND

Cascading Style Sheets (CSS) refers to formatting rules developed by the W3C (World Wide Web Consortium) for web page content. CSS also refers to a style sheet language that can be used to define the appearance and formatting of a document written in a structured document (markup) language. The most common application of CSS is to style web pages written in HTML (HyperText Markup Language) and XHTML (eXtensible HyperText Markup Language). CSS can operate on any XML-type document including but not limited to HTML, XHTML, SVG (Scalable Vector Graphics) and XUL (XML User Interface Language) documents. One convenient feature of using structured documents is that the content can be reused in various contexts and presented in various ways by providing different presentation specifications along with the structured document to the CSS language logic. Presentation specifications can be provided by a style sheet which is a collection of stylistic rules describing colors, fonts and layouts.

The word "cascading" refers to the way CSS determines how a particular element is ultimately displayed in the web page. The style in which the element is displayed is affected by the style sheet created by the author of the page, by the user's customized style selections (if any), by the default styles of the browser that displays the page, by CSS specificity (a methodology that gives different weight to particular kinds of CSS rules), and by the order of CSS rules, creating a complex "cascade" of potentially conflicting rules in which determinations that have higher priority override or "win" over those with lower priorities.

CSS separates content (e.g., HTML code) from the CSS rules that define how the content looks (referred to as "the presentation" of the content). HTML code resides in an HTML file and the CSS rules that define how the content looks reside in an external style sheet file with a .css extension. Sometimes, the CSS rules that define how the content looks reside within a particular part of an HTML document. In addition to controlling the appearance of text on the web site, CSS can be used to control the format and positioning of block-level elements. Block-level elements are produced by using tags such as the h1, p and div tags to delimit blocks of content that are treated as a single element.

A CSS formatting rule is composed of a selector and the declaration or block of declarations. The selector can be a tag such as h1, p, a class name or an identifier that identifies the formatted element. The declaration block defines the style properties to be applied to the indicated content. For example, in the following rule:

```
p {
font-size: 12 pt;
font-family: Arial;
font-weight: bold;
}
``` selector p indicates that the content of a paragraph will be displayed in a 12 point bold Arial font. The font-size, font-family and font-weight tags denote properties of the paragraph content and 12 points, Arial and bold are values of the respective properties. Because one rule can apply to many tags (e.g., in the example rule above, the rule can apply to the content of many different paragraphs), changing the appearance of all the block elements using the same rule can be effected by changing a single rule.

SUMMARY

A set of properties and keyframes in one or more documents that define an animated element or a group of animated elements can be collected and combined into a single internal data structure that represents a complete runtime CSS animation. A set of winning animation properties can be computed for the data structure. The winning set of @keyframes rules referenced by the animation-name property of a style rule (the virtual winning rule) can be computed and represented in a data structure. The data structure can be updated to include an indication of the winning properties. The set of winning animation properties for an animated element or group of animated elements can be used to build a user interface (UI) representation of the animated element or group of animated elements from the data structure. The representation can be used to preview the animated element or group of animated elements during design time without running the application in which the animated element or group of animated elements is embedded. An animated element or group of animated elements can be chosen for previewing and/or modification. The data structure representing the animation can be updated by receiving instructions via a user interface (UI) that can change properties affecting the animated element or group of animated elements. The instructions can be in the form of user gestures. User gestures manipulating the animated element or group of animated elements can be converted or mapped to changes to the internal data structure and to underlying documents in the document closure for the web page in which the animated element or group of animated elements is found.

Changes made to documents affecting the animation can be detected and applied to the data structure. The effect of the changes made to the documents associated with the animation can be computed by applying the standard CSS logic for precedence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1b is a more detailed view of a portion of FIG. 1a;

DETAILED DESCRIPTION

Overview

Figure 1A:
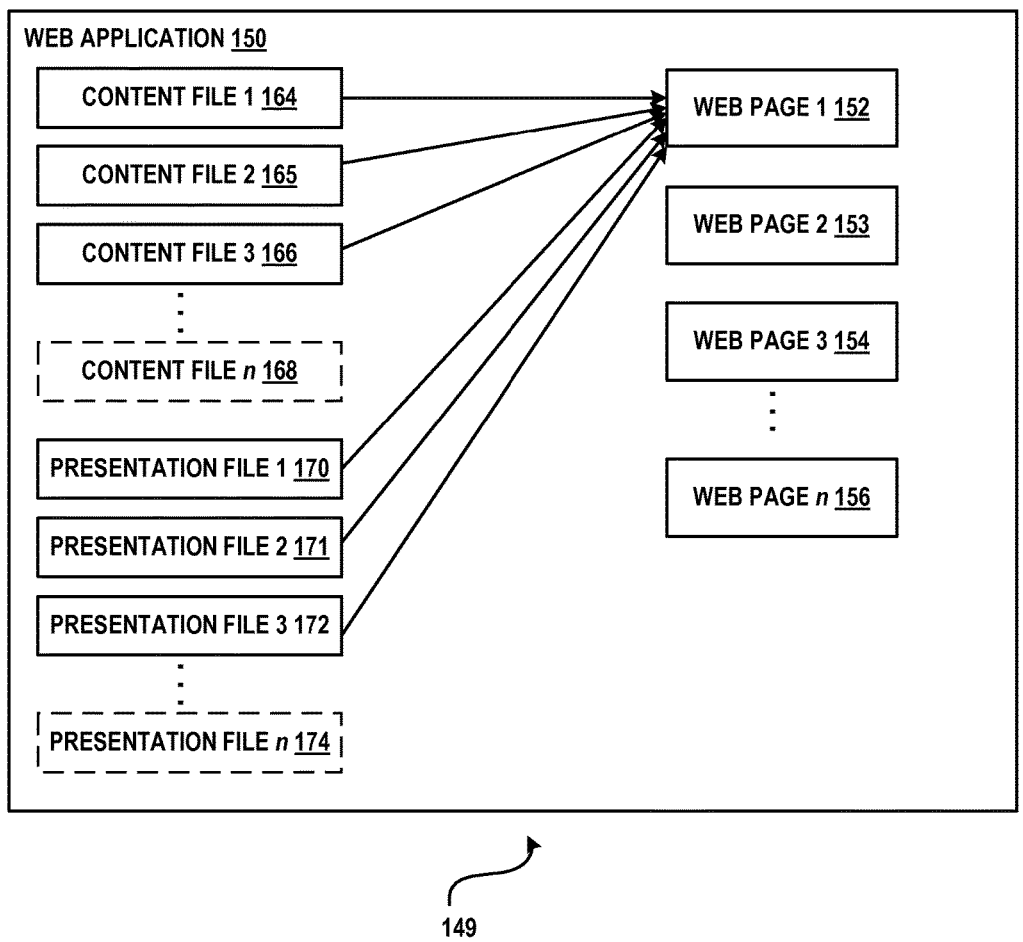
FIG. 1a illustrates an example of a web application.

Generally, the word "animation" refers to rapidly displaying a sequence of images that the eye interprets as movement. One common type of animation is a motion picture. Traditional movies create animation with a camera and a projector. Another common type of animation is a video. A video uses software that rapidly displays a sequence of images on a display device. A CSS animation is a type of animation that is defined using scripts. The scripts define animated elements using the rules and computations prescribed by CSS. The scripts describe how animation properties change over time rather than describing an image at each frame of the animation. The animation is created by interpolating from one set of CSS styles to another over time. A duration is defined which allows the system to map the percentages specified in the keyframe sub-rules to real times.

In CSS an @keyframes rule can be used to create a CSS animation. An @keyframes rule can include multiple sub-rules called keyframes. The changes to the image's position and appearance that take place as the animation is run are specified by specifying in a keyframe sub-rule a percentage of total animation running time at which a particular CSS style rule applies. 0% refers to the beginning of playing the animation and 100% is when the playing of the animation completes. The keywords "from" and "to" can also be used. "From" is the same as 0% and "to" is the same as 100%. The syntax of the @keyframes rule is:

@keyframes animationname {keyframes-selector {css-styles;}} where the value of "animationname" specifies an identifier for the animation and the value of "keyframes-selector" specifies the percentage of the animation duration affected. Css-styles specifies one or more legal CSS property/value declarations. Legal values for "keyframes-selector" are any values between 0% and 100%. Any number of "keyframes-selector"s can be specified for an animation. Any number of css-styles can be specified for a particular keyframes-selector. An animation or portion of an animation can be identified by the property "animationname". An identified animation or an identified portion of an animation can include one animated element or can include a group of animated elements.

CSS animations are typically defined by a set of standard CSS properties that work in concert to determine how the animation will play. The CSS properties that define animations are governed by standard CSS rules for property precedence. The final values of each individual property are computed for an animation according to standardized rules. The rule that takes precedence is called the "winning" rule.

An animation development tool, as described herein, selects an animation rule to edit, extracts from the document closure for the web page in which the animation appears, pieces of the documents that pertain to an animation specified in the rule and creates a composite data structure therefrom. The data structure includes the set of @keyframes rule names that make up the animation and the timing properties (e.g., delay, duration, repeat, fill behavior and the like) that govern the animation. The winning @keyframes rules for an animation and the winning keyframe sub-rule within the winning @keyframes rule that defines the value for each animation property within the @keyframes rule at a given time can be computed. The data structure can be modified to include the winning properties and thus can represent a complete representation of the winning values for the animation.

The data structure can be used to preview the animation in a user interface without running the whole application. The data structure represented in the visual preview can be edited by applying user gestures to the animation displayed in a preview user interface (UI). The user changes can be mapped to changes to property values in the data structure and from there can be mapped to changes in documents in the document closure. The data structure can also be modified in response to changes that are detected in the documents in the document closure. An observer can monitor changes occurring in the documents of the document closure and can update the composite data structure correspondingly.

Changes made in the documents of the document closure that are applied to the data structure can include changes to style rules that define animation CSS properties and/or changes to CSS @keyframes rules which define the keyframe values for a particular portion of the animation. Changes applied to the data structure may trigger a re-computation of the winning values. That is, the @keyframes rule or rules that are included in the animation, the keyframe values for particular properties at particular keyframes in the animation, and the animation properties that affect the behavior of these keyframes can be re-computed. While the animation style rule or element is active for editing, the data structure includes all the data that represents the effect of the animation as if it were being played at runtime.

An animated element or group of animated elements can be selected by selecting a CSS style rule, by selecting a particular CSS @keyframes rule or by selecting a winning virtual rule for the animation. For an animated element or group of animated elements selected using a style rule, animation property values can be read out of the style rule. For the "winning" virtual rule the value can be computed from all the styles that apply to a particular animated element or group of animated elements. The computed animation values can be used to determine the real time values for each keyframe sub-rule.

A set of CSS rules can be generated to enable the animation to appear in the runtime in such a way that it can be played, paused and "scrubbed". "Scrubbing" is a term that originated during the days of reel-to-reel players, when rocking a reel would give the impression of scrubbing tape across the read head. In audio usage it refers to dragging a cursor across a wave form to audition different sections of an audio file and by extension in the animation world, to sample sections within an animation. Because the animation preview generates an internal set of CSS rules to apply to the animations, the design tool can display an animation that would not normally play because of CSS precedence rules.

Edits made to the animation in the preview UI can be mapped to one or more changes to the data structure. Changes made to the data structure can result in corresponding changes being made to the various documents of the document closure that include the values being edited. For example, if an @keyframes rule affecting the currently selected animation is deleted from one of the CSS files in the document closure, another @keyframes rule in the closure that has the same name can be searched for. If one is found, the found @keyframes rule can be used to represent that part of the animation. The preview of the animation in the preview user interface can be updated with the new keyframe values. The UI representation of the animation can be updated so that edits made in the preview UI can be directed to the new @keyframe sub-rule in the documents associated with the animation.

Animation Editing

FIG. 1a illustrates an example 149 of a web application. The web application can be defined by one or more content files (e.g., HTML files) that provide the content of the application and by one or more presentation files (e.g., CSS files) that define how the content is displayed. For example a web application such as web application 150 can be defined by one or more content files (e.g., HTML files) such as content file 1 164, content file 2 165, content file 3 166 . . . content file n 168. Web application 150 can be defined by one or more presentation files (e.g., CSS files) such as presentation file 1 170, presentation file 2 171, presentation file 3 172 . . . presentation file n 174.

A web application such as web application 150 can include one or more web pages such as web page 1 152 (e.g., a website home page), web page 2 153 (e.g., a website contact page), web page 3 154 (e.g., an order page) to web page n 156. One or more of the web pages can include one or more animations. Because an animation can be completely defined in CSS, an animation can be defined by one or more of the presentation files. For example, in FIG. 1b, web page 1 152 includes animation 1 178, animation 2 180 and animation 3 182.

Suppose web page 1 152 is defined by content file 1 164, content file 2 165, content file 3 166 and by presentation file 1 170, presentation file 2 171 and presentation file 3 172. Suppose content file 1 164 is the main HTML file for web page 1 152. Content file 2 165 and content file 3 166 can be included in the files defining web page 1 152 because of dependencies caused, for instance by JavaScript code which loads content file 2 165 and content file 3 166 into web page 1 152. Only portions of content file 2 165 and content file 3 166 may be relevant to web page 1 152. Only portions of presentation file 1 170, presentation file 2 171 and presentation file 3 172 may be relevant to the presentation aspects of web page 1 152. The collection of HTML and CSS files that render a particular web page comprises the document closure. Thus, for example, the document closure for web page 1 152 includes content file 1 164, content file 2 165, content file 3 166, presentation file 1 170, presentation file 2 171 and presentation file 3 172. The same document can be included in the document closure for multiple web pages. For example, although content file 2 165 is included in the document closure for web page 1 152, content file 2 165 can also be included in the document closure for web page 2 153. Similarly, although presentation file 1 170 is included in the document closure for web page 1 152, presentation file 1 170 can also be included in the document closure for web page 2 153.

The rules of CSS determine how a particular element is ultimately displayed in the web page. The style in which the element is displayed is affected by the style sheet created by the author of the page, by the user's customized style selections (if any), by the default styles of the browser that displays the page, by CSS specificity (a methodology that gives different weight to particular kinds of CSS rules), and by the order of CSS rules, so that "winning" property values are derived from potentially conflicting rules affecting the element.

Similarly, the property precedence rules of CSS determine how a particular animated element or group of animated elements is ultimately played in the web page. CSS computes "winning" property values from potentially conflicting rules affecting the animated element or group of animated elements. In accordance with aspects of the subject matter described herein, the overriding value(s) for each individual property can be computed for a particular animated element or group of animated elements to determine the overall animation of the element or group of animated elements.

Figure 1B:
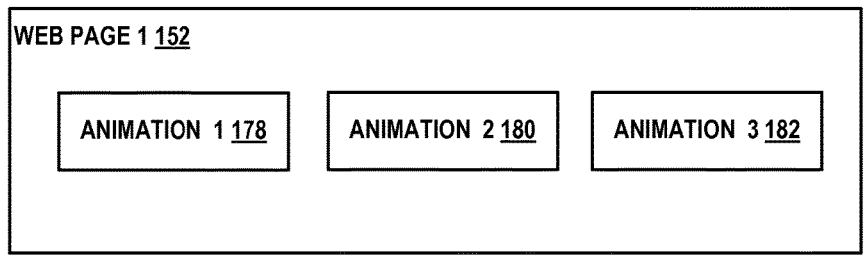
Figure 1C:
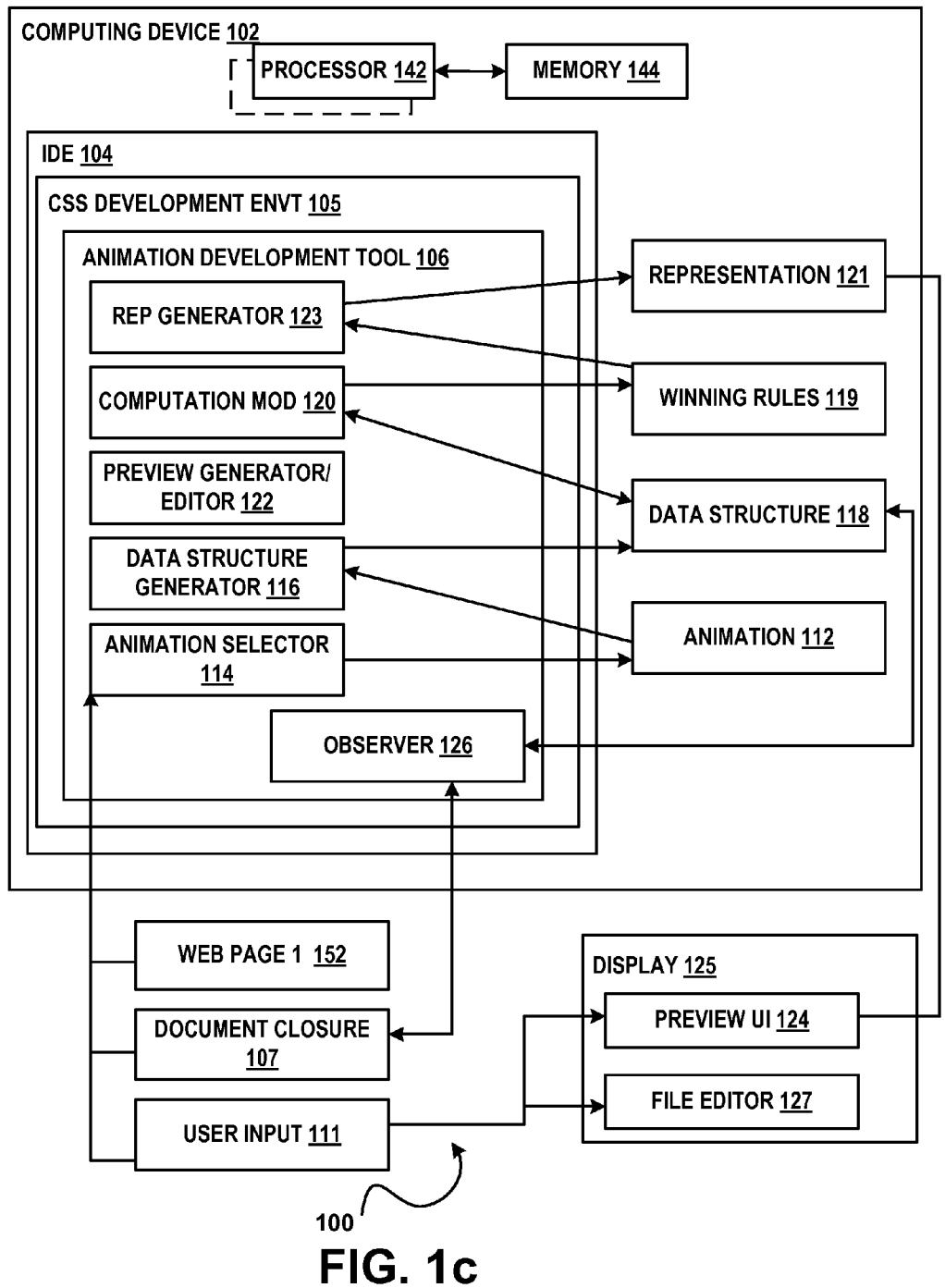
FIG. 1c illustrates an example of system 100 for editing animations in accordance with aspects of the subject matter disclosed herein.

FIG. 1c illustrates an example of an animation development system 100 in accordance with aspects of the subject matter disclosed herein. All or portions of system 100 may comprise one or more computers such as the computers described below with respect to FIG. 3. System 100 may comprise a software development computer such as the software development computer described with respect to FIG. 4. System 100 or portions thereof may execute within an integrated development environment (IDE) such as IDE 104 or may execute outside of an IDE. The IDE can be an IDE such as the one described with respect to FIG. 4 or can be any other IDE. Portions of system 100 can be part of a development environment such as but not limited to Microsoft's Blend® for Visual Studio®, Adobe Edge Tools and/or Tumult Hype. All or portions of system 100 may be implemented as a plug-in or add-on. All or portions of system 100 can operate within or be associated with a browser such as for example, Microsoft Internet Explorer®, Mozilla's Firefox, or any browser now known or developed in the future.

System 100 may include one or more computers or computing devices such as a computing device 102. Computing device 102 can be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

Computing device 102 can comprise: one or more processors such as processor 142, etc., a memory such as memory 144, and all or portions of a CSS animation development tool such as animation development tool 106. CSS animation development tool 106 can be a part of a CSS development environment such as CSS development environment 105. CSS animation development tool 106 can include one or more modules that when loaded into memory can cause at least one processor to perform the tasks attributed to the one or more modules. CSS animation development tool 106 can include one or more of: an animation selector such as animation selector 114, a data structure generator such as data structure generator 116, a preview generator/editor such as preview generator/editor 122, a computation module such as computation module 120 and/or a representation generator such as representation generator 123. Animation development tool 106 can display an animation in a preview UI such as preview UI 124 on a display device such as display 125. Animation development tool 106 can display documents in a document editor such as file editor 127 on a display device such as display 125. It will be appreciated that the one or more program modules such as, by way of example but not limitation, program modules comprising a CSS animation development tool 106 as described herein, (e.g., animation selector modules, data structure generator modules, etc.) can be loaded into memory 144 to cause one or more processors such as processor 142, etc. to perform the actions attributed to the one or more modules of the CSS animation development tool 106.

An application can be loaded into a development environment such as CSS development environment 105. A file such as an HTML file representing the content of a web page can be selected and can be received by animation development tool 106. Suppose, for example, web application 150 described in FIG. 1a is loaded into the CSS development environment 105 and that web page 1 152 is selected for editing. Web page 1 can be received by an animation selector such as animation selector 114. All of the HTML and CSS files that are used to render the selected web page can be determined. The collection of HTML and CSS files that render the selected web page comprises the document closure for the web page. Thus, for example, the document closure for web page 1 152 may include content file 1 164, content file 2 165, content file 3 166, presentation file 1 170, presentation file 2 171 and presentation file 3 172. The document closure for the selected web page (e.g., document closure 107 for web page 1 152) can be received by animation development tool 106.

An animated element or group of animated elements to edit can be selected from the selected web page. For example, in FIG. 1b, user input such as user input 111 can be provided to an animation selector such as animation selector 114 to select an animated element or group of animated elements to edit, such as animation 112. An animated element or group of animated elements can be selected from the web page by selecting a CSS style rule. A style rule used to select an animated element or group of animated elements can be: a standard CSS style rule, the inline style rule for an element, or the virtual winning style rule which represents all the winning style properties for an animated element. To select an animated element or group of animated elements from the web page, a CSS style rule that references at least one @keyframes rule can be selected by using the animation-name CSS property. For example:

```
p {
    animation-name: foo
}
may reference the @keyframes rule:
    @keyframes foo {
    }
```

Alternatively, a style rule listed inline in the HTML code for an animated element or group of animated elements of interest can be provided, as follows:
    <div style="animation-name: a1, a2; animation-duration: 1s, 2s;"></div>
Alternatively, a virtual (computed) style rule that represents the winning style property values for the element can be provided. An option to calculate the winning rule values for a specified animated element can be provided. If more than one animation names are defined in the CSS style rule, a list of animation names (identifiers) can be created and displayed for selection.

The selected animated element or group of animated elements (e.g. animation 112) can be provided to a data structure generator such as data structure generator 116 that receives the selected animation 112 and the document closure for the web page (e.g., document closure 107 for web page 1 152) and generates a data structure such as data structure 118 therefrom. Data structure generator 116 can traverse the files in the document closure that affect the rendering of the selected web page and can extract portions of documents in the document closure that pertain to the selected animated element or group of animated elements. For example, data structure generator 116 can select from the document closure 107 for web page 1 152, the portions of the documents in the document closure 107 that pertain to the selected animation 112. Any of the properties and rules selected can come from any document in the document closure. Data structure generator 116 can search for properties and @keyframe sub-rules that affect the selected animation. The collection of properties and @keyframe sub-rules extracted from the web page document closure can be combined into a single composite data structure such as data structure 118.

The data structure 118 can be updated as the documents in the document closure are edited. Changes to the documents in the document closure can cause the data structure to be updated. The @keyframes rule or rules that are included in the data structure, the keyframe values for particular properties at particular keyframes in the data structure, and the animation properties that affect the behavior of these keyframes can be re-computed by a computation module. The winning properties reflected in the data structure can be updated as described below.

A computation can be run on the data structure 118 by a computation module such as computation module 120 to determine the winning CSS properties and the winning CSS @keyframes rules (e.g., winning rules 119). Computation module 120 can update the property state in the data structure as the documents involved are edited. Computation module 120 can compute the winning @keyframes rule for a particular animated element. Computation module 120 can determine the keyframe sub-rule within the winning @keyframes rule that defines the value for each animation property within the winning @keyframes rule at a given time. Computation module 120 can determine the animation properties that establish the timing properties for the animation (delay, duration, repeat, fill behavior, and the like). If an animation is selected by specifying a style rule, property values can be read out of the style rule. If an animation is selected by specifying a "winning" virtual rule the values can be computed from all the styles that apply to a particular animated element or group of animated elements. The animation values can be used to determine the real time values for each keyframe.

The computation can be run on the data structure to produce a complete representation of the animation. A complete representation such as representation 121 of the animation 112 can be produced. A representation of the animation can be created. The data structure 118 and/or representation 121 can be used by a preview generator such as preview generator/editor 122 to create a preview of the selected animation without running the application. The representation 121 can be sent to an instance of a web browser that can be used to render the preview UI 124. A dynamic set of style rules can be developed that simulate the running of the animation during execution of the application.

The preview of the animation can use a negative delay and a paused play state to simulate pausing the animation at a particular time allowing the animation to be scrubbed. Negative delay refers to setting the animation-delay value of the animation to a negative number. Doing so, combined with setting the play-state to "paused" causes the animation to set values for a particular time by moving that time point to time 0 of the overall animation. For example, suppose an animation is 3 seconds long and has a delay of 0 seconds. Suppose a user wants to see what the animation looks like at 1.5 seconds. By setting the animation-delay to −1.5 seconds, when the animation starts in a paused state (remaining at time 0) the values that would have been applied had the animation played naturally to 1.5 seconds can be seen.

Because the animation preview generates new CSS rules to which to apply to the animation, and does not use the existing ones in the document closure documents, animations that would not normally play because of CSS precedence rules can play.

The preview can be displayed in a preview user interface such as preview UI 124. Preview generator/editor 122 can provide a visualization of an animation during development. A visual preview provided in the preview UI can enable the effects of editing the animation in the animation development tool to be observed. Preview generator/editor 122 can enable a user to change the current time visible in the preview UI 124. The animation can be edited by via user input (user input 111). User input can comprise user gestures that are transformed into changing property values of an animated element or group of animated elements. The user gestures can be mapped to changes in the data structure. The changes in the data structure can be propagated out to the HTML and CSS files the change affects.

The animation can also be edited by changing one of the documents in the document closure. The changes made to a document in the document closure can be applied to the data structure. Changes to the data structure can change the animation in the preview. Changing a document can mean the winning values have to be re-computed. An observer such as observer 126 can monitor the documents in the document closure and in response to detecting that at least one of the CSS documents has changed, the winning values can be re-computed. The representation 121 can be updated. The data structure can be updated, updating what appears in the preview UI 124.

Once the data structure 118 is updated to correspond to the changes in all of the documents in the document closure, it fully represents the animation that is currently being edited. The composite data structure can be used to generate a user interface which represents the animation being edited. Because the data structure coalesces all of the information about the animation from multiple documents, building this interface is straightforward. Edits made using the user interface can be mapped to one or more changes to the data structure. The changes can be mapped to corresponding changes in the various documents that include the values being edited. For example, if an @keyframes rule included in the currently selected animation is deleted from one of the CSS files in the document closure then another @keyframes rule in the closure that has the same name can be substituted for the deleted rule, if one exists. The preview of the animation in the preview UI can be updated with the new keyframe values. The data structure of the animation can be updated with the new keyframe values. Edits to the animation made in the preview UI can be directed to the new @keyframes rule in markup.

Figure 2:
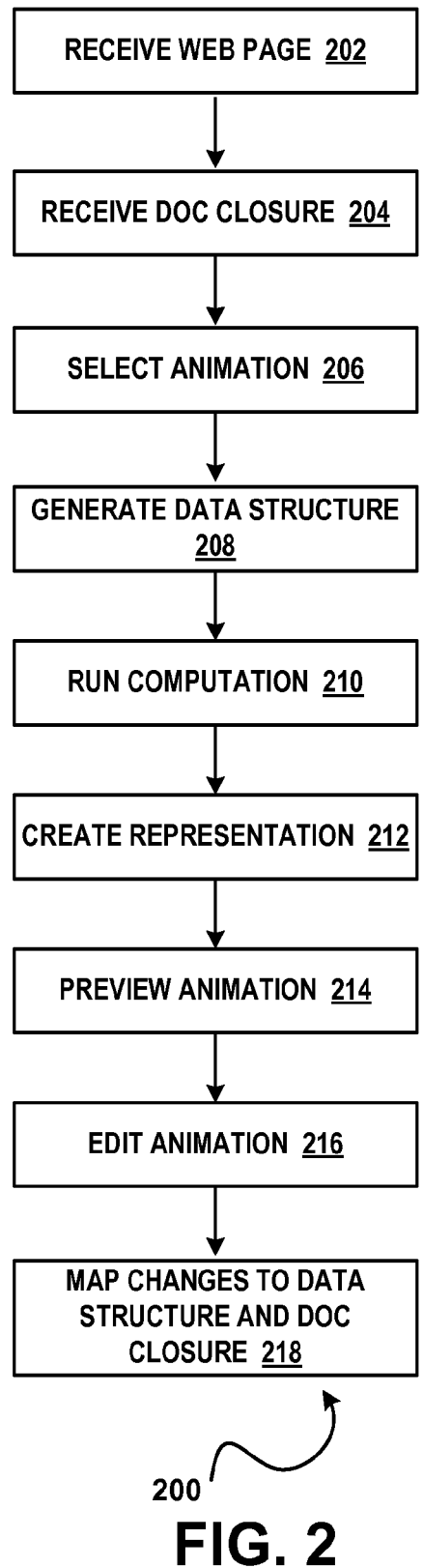
FIG. 2 illustrates an example of a method 200 for editing animations in accordance with aspects of the subject matter disclosed herein.

FIG. 2 illustrates a method 200 that can edit an animation in accordance with aspects of the subject matter disclosed herein. The method described in FIG. 2 can be practiced by a system such as but not limited to the one described with respect to FIG. 1*b*. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

In operation a system such as the system described in FIG. 1*b* can operate as follows. An application can be loaded into a development environment such as a CSS development environment. The application can be comprised of a plurality of CSS and HTML files that make up the application. The application can be a web application and can include a plurality of web pages. At operation 202 a file such as an HTML file representing the content of a web page can be selected for editing and can be provided to an animation development tool. The selected web page can be received by the animation development tool. All of the HTML and CSS files (the document closure) that are used to render the selected web page can be determined. The document closure for the selected web page can be received by the animation development tool at operation 204.

At operation 206 an animation to edit can be selected from the selected web page. An animation can be selected from the web page by selecting a CSS style rule. A style rule used to select an animation can be: a standard CSS style rule, the inline style rule for an element, or the virtual winning style rule which represents all the winning style properties for an animated element. To select an animation from the web page, a CSS style rule can be selected. The selected CSS style rule can be examined for a reference to one or more @keyframes rules that specify an animation name or identifier. The identified animation may include an animated element or a group of animated elements.

A data structure can be generated at operation 208 from the documents of the document closure by walking the files in the document closure that affect the rendering of the selected web page. The portions of the documents in the document closure that pertain to the selected animation can be selected. Any of the properties and rules selected can come from any document in the document closure. Properties and @keyframes rules that affect the selected animation can be selected and can be combined into a single data structure. At operation 210 a computation can be run on the data to determine the winning CSS properties and the winning CSS @keyframe sub-rules.

The data structure can be updated with the computation results to create a complete representation of the animation at operation 212. The representation can be used to create a preview of the selected animation without running the application. The preview can be played at operation 214, providing a visualization of the animation during development. The current time visible can be changed. A dynamic set of style rules can be developed that simulate the running of the animation during execution of the application. Because new CSS rules are generated to apply to the animation, an animation that would not normally play because of CSS precedence rules can play.

The animation can be edited by user input at operation 216. User input can comprise user gestures that are transformed into changes to property values of an animated element or group of animated elements. At 218 the user gestures can be mapped to changes in the data structure. The changes in the data structure can be propagated out to the HTML and CSS files the change affects. The element can also be edited by changing one of the documents in the document closure. The changes made to a document in the document closure can be applied to the data structure. Changes to the data structure can change the animation in the preview of the animated element. Changing a document trigger re-computation of the winning values. The documents in the document closure can be monitored. In response to detecting that at least one of the documents in the document closure has changed, the winning values can be re-computed. The representation can be updated. The data structure can be updated. The preview can be updated.

Example of a Suitable Computing Environment

Figure 3:
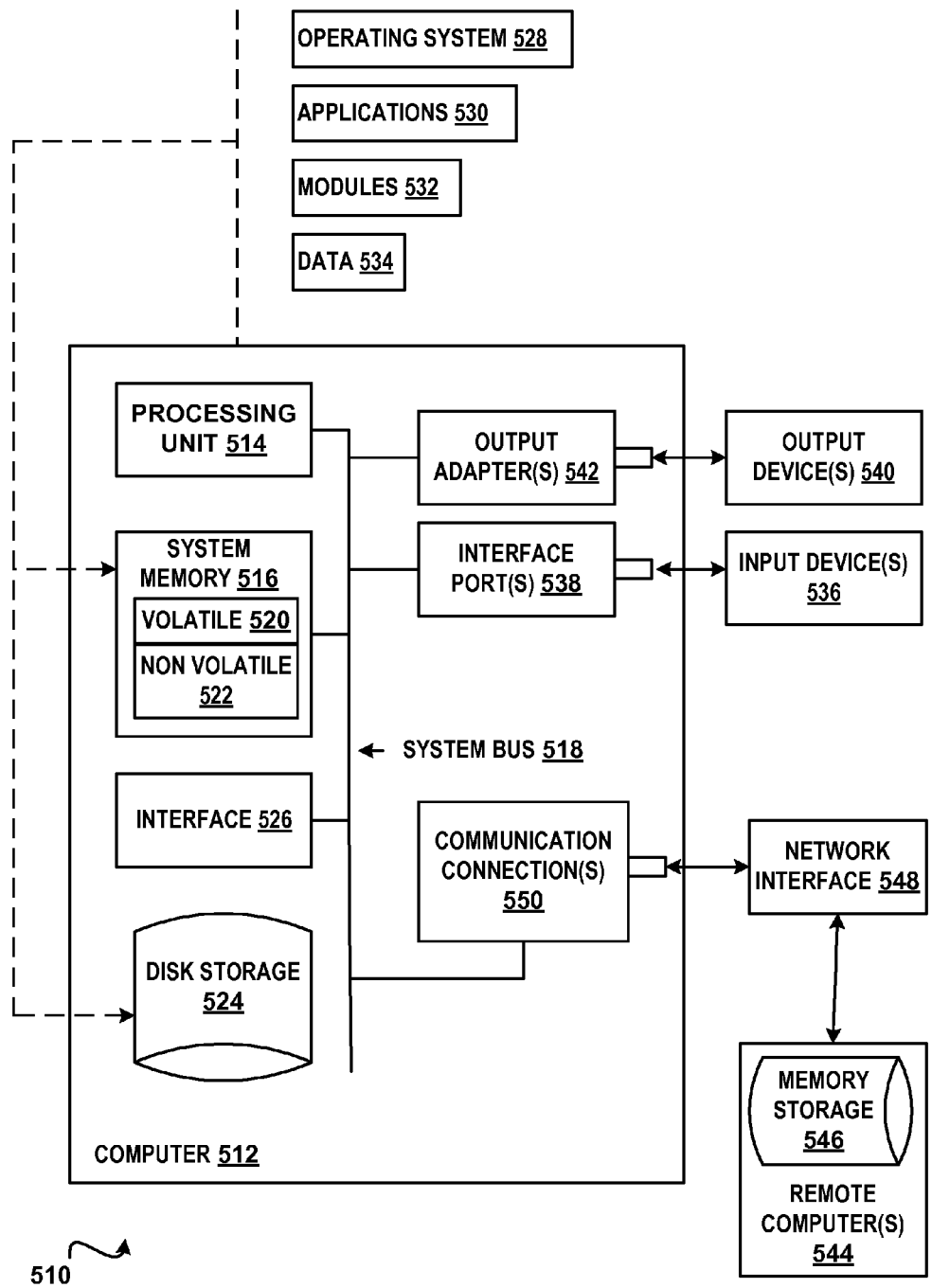
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
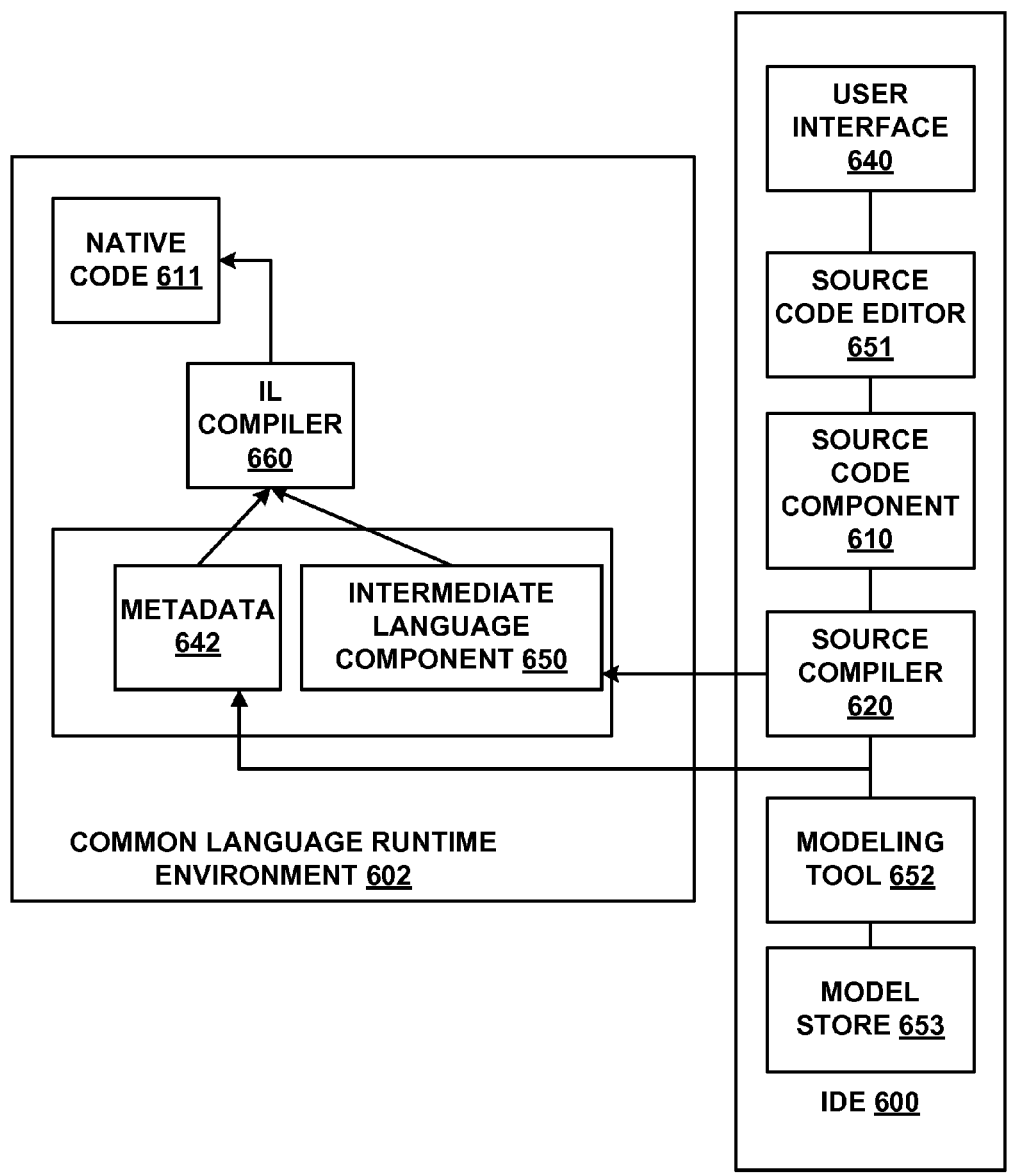
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above.

What is claimed:

1. A system comprising:

at least one processor of a computing device;

a memory of the computing device; and an animation development tool comprising at least one program module that causes the at least one processor to:

receive a document closure for a web page, the web page including an animation, the document closure including at least one content file and at least one presentation file;

extract from the document closure, pieces of documents of the document closure, into a data structure representing the animation, the extracted pieces pertaining to the animation, the data structure differs from the web page;

preview the animation in the animation development tool from the data structure; and convert user gestures manipulating properties of the animation to changes to the data structure;

generate an internal set of CSS rules to apply to the animation that because of CSS precedence rules, would not play when an application including the animation is run;

compute a set of winning animation properties for the animation; and update the data structure with an indication of the winning properties.

2. The system of claim 1, further comprising:

at least one program module causing the at least one processor to:

apply changes made to the data structure to the document closure.

3. The system of claim 1, further comprising:

at least one program module causing the at least one processor to:

select the animation by selecting a CSS style rule, the CSS style rule comprising one of: a standard CSS style rule, an inline style rule for an element, or a virtual winning style rule representing winning style properties for the animation.

4. The system of claim 3, further comprising:
at least one module causing the at least one processor to:
extract from the document closure for the web page pieces of documents of the document closure, the pieces pertaining to the selected animation to create the data structure.

5. The system of claim 1, further comprising:
at least one module causing the at least one processor to:
in response to detecting a change to a document in the document closure, update the data structure representing the animation.

6. The system of claim 1, further comprising:
at least one module causing the at least one processor to:
use the data structure to build a design time preview of the animation without changing documents in the document closure.

7. The system of claim 1, further comprising:
at least one program module causing the at least one processor to:
compute a winning @keyframes rule for the animation and a keyframe sub-rule within the winning @keyframes rule.

8. A method comprising:
receiving by a processor of a computing device a web page and a document closure for the web page, the document closure including at least one content file and at least one presentation file;
selecting an animation from the web page;
extract from the document closure, pieces of documents of the document closure, into a data structure representing the animation, the extracted pieces pertaining to the animation, the data structure differs from the web page;
previewing the animation in an animation development tool user interface using the data structure;
receiving at least one modification to the animation previewed in the user interface;
applying the at least one modification to the data structure representing the animation;
generate an internal set of CSS rules to apply to the animation that because of CSS precedence rules, would not play when an application including the animation is run;
compute a set of winning animation properties for the animation; and
update the data structure with an indication of the winning properties.

9. The method of claim 8, further comprising:
selecting an animation from the web page by selecting a CSS style rule, the CSS style rule comprising one of: a standard CSS style rule, an inline style rule for an element, or a virtual winning style rule representing winning style properties for the animation.

10. The method of claim 8, further comprising:
in response to detecting a change to a document in the document closure, updating the data structure representing the animation.

11. The method of claim 8, further comprising:
selecting properties and @keyframe rules affecting the selected animation from a document closure for the web page; and
combining the selected properties and the selected @keyframe rules into the data structure.

12. The method of claim 8, further comprising:
applying user gestures to the preview of the animation;
transforming the user gestures to changes to property values in the data structure.

13. The method of claim 8, further comprising:
using the data structure to build a design time preview of the animation without changing documents in the document closure.

14. A device, comprising:
at least one processor and a memory;
the at least one processor configured to:
select an animation from a web page;
extract from a document closure for the web page, pieces of documents of the document closure, the extracted pieces pertaining to the selected animation, the document closure including at least one content document and at least one presentation document;
create a composite data structure from the extracted pieces, the composite data structure differs from the web page;
create a complete representation of the selected animation from the composite data structure;
play a preview of the animation from the complete representation of the selected animation;
in response to receiving input manipulating the preview, convert the input to changes to properties of the animation;
update corresponding properties in the composite data structure;
generate an internal set of CSS rules to apply to the animation that because of CSS precedence rules, would not play when an application including the animation is run;
compute a set of winning animation properties for the animation; and
update the composite data structure with an indication of the winning properties.

15. The device of claim 14, wherein the at least one processor is further configured to:
applying user gestures to the preview of the animation;
transforming the user gestures to changes to property values in the composite data structure.

16. The device of claim 14, wherein the at least one processor is further configured to:
in response to detecting a change to a document in the document closure, update the composite data structure representing the animation.

17. The device of claim 14, wherein the at least one processor is further configured to:
select properties and @keyframe rules affecting the selected animation from the document closure for the web page; and
combine the selected properties and the selected @keyframe rules into the composite data structure.

18. The device of claim 14, wherein the at least one processor is further configured to:
compute a winning @keyframes rule for the animation and an keyframe sub-rule within the winning @keyframes rule, the keyframe sub-rule defining a value for each animation property within the @keyframes rule at a particular time.

19. The device of claim 14, wherein that at least one processor is further configured to:
selecting an animation from the web page by selecting a CSS style rule, the CSS style rule comprising one of: a standard CSS style rule, an inline style rule for an element, or a virtual winning style rule representing winning style properties for the animation.

* * * * *